US012278058B2

(12) United States Patent
Watanabe

(10) Patent No.: US 12,278,058 B2
(45) Date of Patent: *Apr. 15, 2025

(54) MULTILAYER CERAMIC CAPACITOR

(71) Applicant: Murata Manufacturing Co., Ltd., Nagaokakyo (JP)

(72) Inventor: Yukie Watanabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,318

(22) Filed: Apr. 3, 2024

(65) Prior Publication Data

US 2024/0266118 A1    Aug. 8, 2024

Related U.S. Application Data

(63) Continuation of application No. 17/849,762, filed on Jun. 27, 2022, now Pat. No. 11,972,905.

(30) Foreign Application Priority Data

Jul. 7, 2021  (JP) ................................. 2021-113069

(51) Int. Cl.
    *H01G 4/30* (2006.01)
    *H01G 4/008* (2006.01)
    *H01G 4/012* (2006.01)
    *H01G 4/12* (2006.01)
    *H01G 4/224* (2006.01)

(52) U.S. Cl.
    CPC .............. *H01G 4/30* (2013.01); *H01G 4/008* (2013.01); *H01G 4/012* (2013.01); *H01G 4/12* (2013.01); *H01G 4/224* (2013.01)

(58) Field of Classification Search
    CPC .......... H01G 4/008; H01G 4/012; H01G 4/12; H01G 4/224; H01G 4/30
    See application file for complete search history.

(56) References Cited

U.S. PATENT DOCUMENTS 11,972,905 B2 * 4/2024 Watanabe ................ H01G 4/12
2024/0339266 A1 * 10/2024 Lee ...................... H01G 4/2325

OTHER PUBLICATIONS

Watanabe, "Multilayer Ceramic Capacitor", U.S. Appl. No. 17/849,762, filed Jun. 27, 2022.

* cited by examiner

*Primary Examiner* — Nathan Milakovich
(74) *Attorney, Agent, or Firm* — Keating & Bennett, LLP

(57) ABSTRACT

A multilayer ceramic capacitor includes a multilayer body including dielectric ceramic layers and internal electrode layers laminated alternately in a lamination direction, and a pair of external electrodes on both end portions in the length direction of the multilayer body and respectively connected to the internal electrode layers. The pair of external electrodes each include a base region covering at least each of the first and second end surfaces and connected to the internal electrode layers, and a cover region on the base region to cover the base region. The cover region includes maximum thickness portions each including a maximum thickness in the cover region, in a region corresponding to the ranges of about ±10 μm in the lamination direction centered around internal electrode layers at both outermost ends in the lamination direction among the internal electrode layers.

16 Claims, 5 Drawing Sheets

US 12,278,058 B2

MULTILAYER CERAMIC CAPACITOR

CROSS REFERENCE TO RELATED APPLICATIONS

This application claims the benefit of priority to Japanese Patent Application No. 2021-113069 filed on Jul. 7, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors are known, each of which includes a multilayer body including a plurality of dielectric ceramic layers and a plurality of internal electrode layers laminated therein, and external electrodes provided at both ends of the multilayer body. In such multilayer ceramic capacitors, an improvement in performance has been attempted by thinning the external electrodes to increase the volume of the multilayer body and increase the area ratio of internal electrodes. For example, Japanese Unexamined Patent Application Publication No. 2019-179874 discloses a multilayer ceramic capacitor including a Ni layer and Sn plated layer provided on the Ni layer, and describes that the thickness of the Ni layer and the Si content with respect to the Ni content in the Ni layer are specified such that the external electrodes are thinned.

The thinning of the external electrodes shortens the passage of moisture from the outside. This may decrease the moisture resistance. Japanese Unexamined Patent Application Publication No. 2019-179874 does not describe measures to prevent a moisture resistance decline. Therefore, there is room for improvement.

SUMMARY OF THE INVENTION

Preferred embodiments of the present invention provide multilayer ceramic capacitors that each achieve both thinning and moisture resistance improvement of external electrodes.

A multilayer ceramic capacitor according to a preferred embodiment of the present invention includes a multilayer body a multilayer body including a plurality of dielectric ceramic layers and a plurality of internal electrode layers which are laminated alternately in a lamination direction, a first main surface and a second main surface opposing each other in the lamination direction, a first side surface and a second side surface opposing each other in a width direction perpendicular or substantially perpendicular to the lamination direction, and a first end surface and a second end surface opposing each other in a length direction perpendicular or substantially perpendicular to the lamination direction and the width direction, and a pair of external electrodes on both end portions in the length direction of the multilayer body to respectively cover at least the first end surface and the second end surface, and respectively connected to the internal electrode layers, wherein the pair of external electrodes each include a base region covering at least each of the first end surface and the second end surface and connected to the internal electrode layers, and a cover region on the base region to cover the base region, and the cover region includes a maximum thickness portion including a maximum thickness in the cover region, in a region corresponding to a range of about ±10 μm in the lamination direction centered around internal electrode layers provided at both outermost ends in the lamination direction among the plurality of internal electrode layers.

According to preferred embodiments of the present invention, it is possible to provide multilayer ceramic capacitors that each achieve both thinning and moisture resistance improvement of the external electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
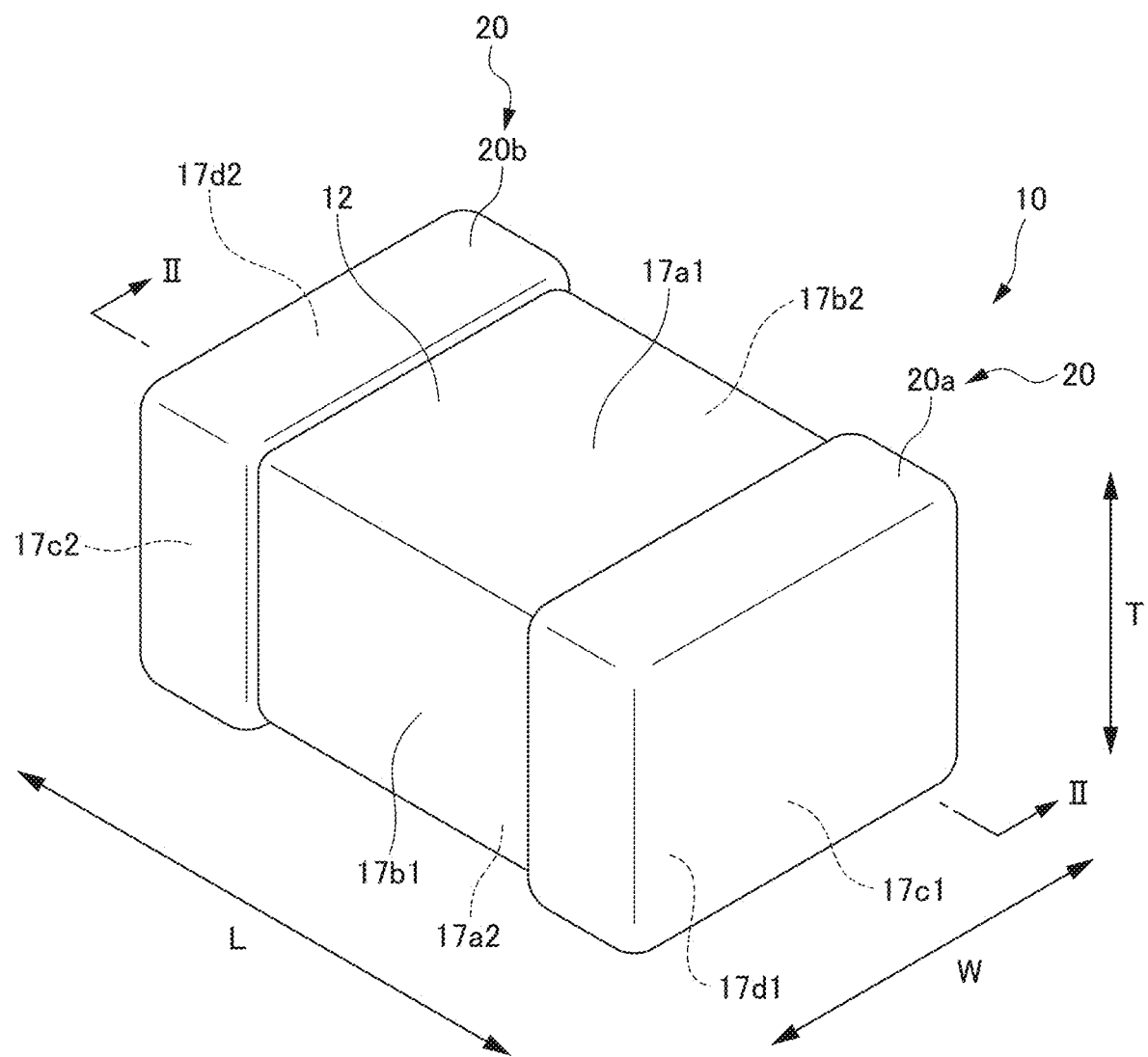
FIG. 1 is a schematic perspective view of a multilayer ceramic capacitor according to a preferred embodiment of the present invention.
Figure 2:
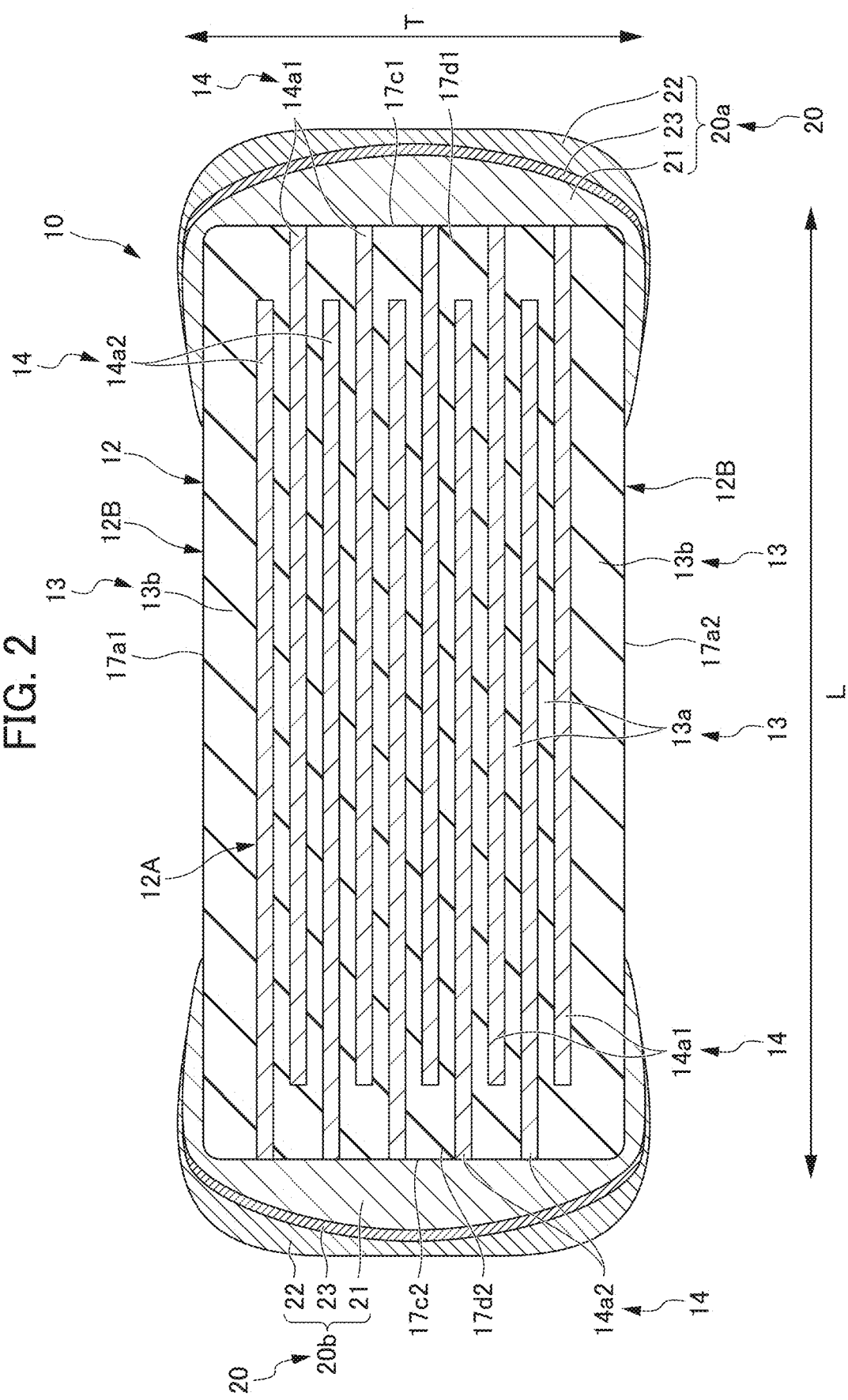
FIG. 2 is a cross-sectional view taken along the line II-II of FIG. 1.

Preferred embodiments of the present invention will be described below with reference to the drawings. FIG. 1 is a schematic perspective view of a multilayer ceramic capacitor 10 according to a preferred embodiment of the present invention. FIG. 2 is a cross-sectional view taken along the line II-II shown in FIG. 1.

As shown in FIG. 1, the multilayer ceramic capacitor 10 of the present preferred embodiment of the present invention may have a rectangular or substantially rectangular parallelepiped shape as a whole. The multilayer ceramic capacitor 10 may include a multilayer body 12 and a pair of external electrodes 20 which are spaced apart from each other.

Figure 5:
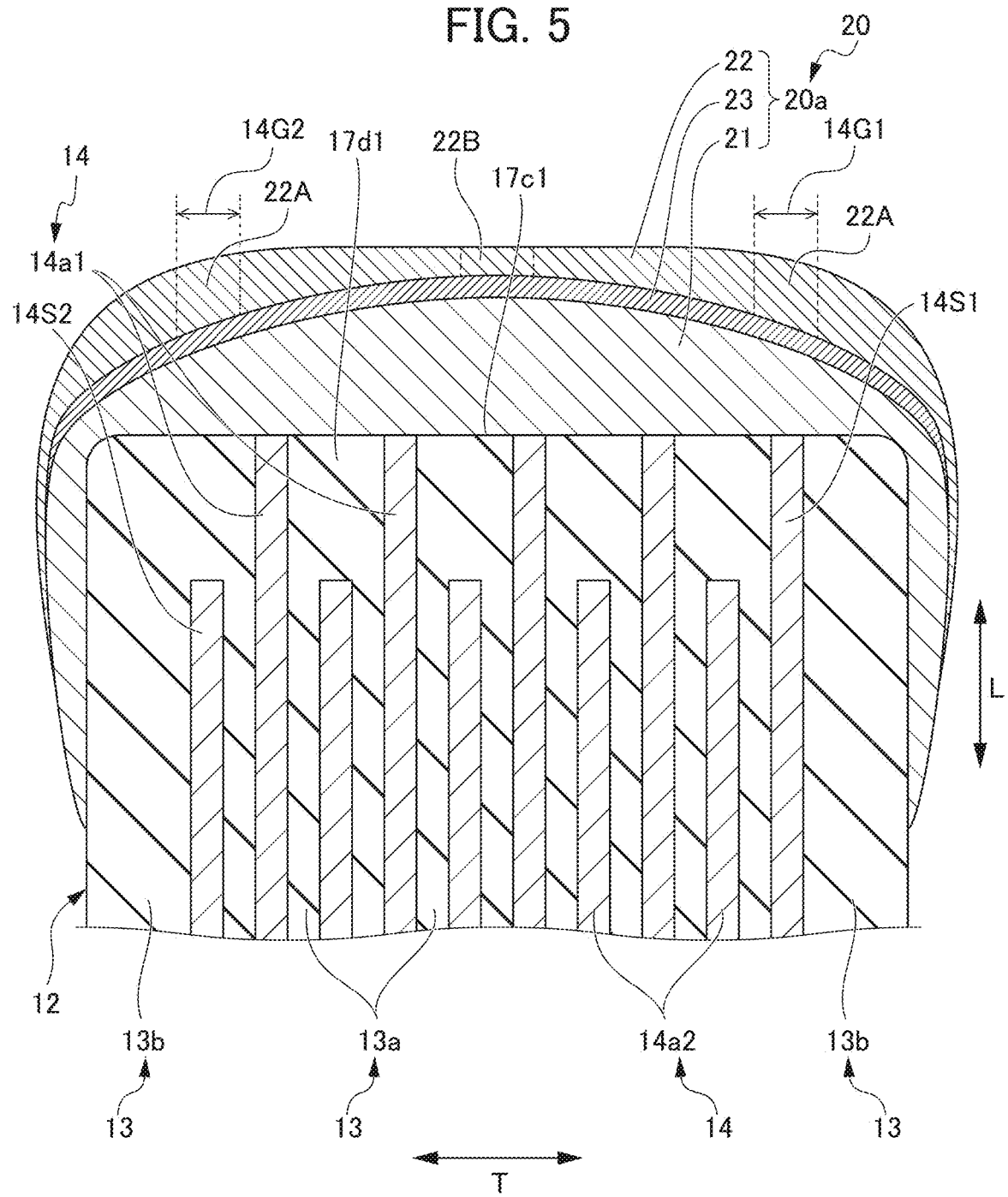
FIG. 5 is an enlarged cross-sectional view of an end portion in a length direction L of a multilayer ceramic capacitor according to a preferred embodiment of the present invention.

In FIG. 1, the arrow T indicates the lamination (stacking) direction of the multilayer ceramic capacitor 10 and the multilayer body 12. In FIGS. 1 and 2, the arrows L each indicate a length direction perpendicular or substantially perpendicular to the lamination direction T of the multilayer ceramic capacitor 10 and the multilayer body 12. In FIG. 1, the arrow W indicates a width direction perpendicular or substantially perpendicular to the lamination direction T and the length direction L of the multilayer ceramic capacitor 10 and the multilayer body 12. The cross-sectional view shown in FIG. 2 shows an LT cross section which is taken along the length direction L and the lamination direction T at a middle portion in the width direction W of the multilayer ceramic capacitor 10 and the multilayer body 12. FIG. 5 also shows the lamination direction T and the length direction L.

As shown in FIGS. 1 and 2, the multilayer body 12 may include a first main surface 17a1 and a second main surface 17a2 that are opposed to each other in the lamination direction T, a first side surface 17b1 and a second side surface 17b2 that are opposed to each other in the width direction W, and a first end surface 17c1 and a second end surface 17c2 that are opposed to each other in the length direction L. In the following, one end portion in the vicinity of the first end surface 17c1 in the length direction L of the multilayer body 12 is defined as an end portion 17d1 in the vicinity of the first end surface, for example. Furthermore, the other end portion in the vicinity of the second end surface 17c2 in the length direction L of the multilayer body 12 is defined as an end portion 17d2 in the vicinity of the second end surface, for example. The pair of external electrodes 20 may include a first external electrode 20a and a second external electrode 20b. The first external electrode 20a may be provided on the end portion 17d1 in the vicinity of the first end surface. The second external electrode 20b may be provided on the end portion 17d2 in the vicinity of the second end surface. The first external electrode 20a may cover the first end surface 17c1. The second external electrode 20b may cover the second end surface 17c2.

As shown in FIG. 2, the multilayer body 12 may include a plurality of dielectric ceramic layers 13 and a plurality of internal electrode layers 14 laminated alternately along the lamination direction T. Furthermore, the multilayer body 12 may include an inner layer portion 12A and a pair of outer layer portions 12B. In the inner layer portion 12A, each of the plurality of internal electrode layers 14 may face each other with the first dielectric ceramic layer 13a to be described later interposed therebetween. The pair of outer layer portions 12B may sandwich the inner layer portion 12A in the lamination direction T.

The dielectric ceramic layer 13 may be provided by firing a ceramic material including barium titanate as a main component, for example. The internal electrode layer 14 may be made of a metal material, such as, for example, Ni, Cu, Ag, Pd, Ag—Pd alloy, Au, or other conductive materials.

As shown in FIG. 2, the plurality of internal electrode layers 14 may include a plurality of first internal electrode layers 14a1 and a plurality of second internal electrode layers 14a2. The first internal electrode layers 14al and the second internal electrode layers 14a2 may be alternately laminated with the dielectric ceramic layers 13 interposed therebetween.

In the first end surface 17c1 of the multilayer body 12, end surfaces on one end in the length direction L of the plurality of first internal electrode layers 14al are exposed, respectively. These end surfaces may be in contact with the first external electrode 20a to provide electrical connection. In the second end surface 17c2 of the multilayer body 12, end surfaces on the other end in the length direction L of the plurality of second internal electrode layers 14a2 are exposed, respectively. These end surfaces may be in contact with the second external electrode 20b to provide electrical connection. Thus, the plurality of capacitor elements may be electrically connected in parallel between the first external electrode 20a and the second external electrode 20b.

As shown in FIG. 2, the dielectric ceramic layers 13 may include a plurality of first dielectric ceramic layers 13a, and a pair of second dielectric ceramic layers 13b. The plurality of first dielectric ceramic layers 13a may be sandwiched between the first internal electrode layers 14al and the second internal electrode layers 14a2. The pair of second dielectric ceramic layers 13b may be provided at both ends in the lamination direction T. The pair of second dielectric ceramic layers 13b may be thicker than the first dielectric ceramic layer 13a, respectively. The thickness of the first dielectric ceramic layer 13a may be, for example, about 0.4 μm or more and about 0.53 μm or less.

The multilayer ceramic capacitor 10 may be manufactured in the following manner, for example. First, materials defining and functioning as the dielectric ceramic layer 13 and the internal electrode layer 14 are laminated to provide the multilayer body 12. Then, each material of the multilayer body 12 is fired, after which the external electrodes 20 are formed such that the multilayer ceramic capacitor 10 is manufactured.

More specifically, the multilayer body 12 may be manufactured by the following method, for example. For example, a conductive paste defining and functioning as the internal electrode layer 14 is printed on the surface of a ceramic green sheet defining and functioning as the dielectric ceramic layer 13 and having a thickness of about 0.6 μm or more and 1.2 μm or less, to form internal electrode patterns. The thickness of the internal electrode pattern may be, for example, about 0.6 μm or more and about 2.0 μm or less.

A predetermined number of ceramic green sheets for the inner layer portion 12A on which the inner electrode patterns are provided may be laminated, following which ceramic green sheets for the outer layer portions 12B may be laminated respectively on both end surfaces in the lamination direction T, such that a laminate sheet is obtained. Then, the laminate sheet may be pressed in the laminating direction to crimp the ceramic green sheets to each other, such that a laminate mother block is obtained. The laminate mother blocks may then be divided into chips by dicing, cutting, or the like, for example, resulting in a plurality of chips. The chips thus obtained may be fired under predetermined conditions to obtain the multilayer body 12. Thereafter, the multilayer body 12 may be polished, such as by barrel polishing, for example.

As shown in FIGS. 1 and 2, the first external electrode 20a may be provided on the end portion 17d1 in the vicinity of the first end surface of the multilayer body 12. The second external electrode 20b may be provided on the end portion 17d2 in the vicinity of the second end surface of the multilayer body 12. The first external electrode 20a and the second external electrode 20b may be made of a conductive film having the same or substantially the same structure. In the following description, when the first external electrode 20a and the second external electrode 20b are explained without distinguishing from each other, they may be collectively referred to as the external electrode 20.

As shown in FIG. 2, the external electrode 20 of the present preferred embodiment of the present invention may each include a metal base region 21, a metal cover region 22, and a reaction region 23. The metal base region 21 may be in direct contact with the multilayer body 12. The metal cover region 22 may cover the base region 21. The reaction region 23 may be provided between the base region 21 and the cover region 22.

Both of the base region 21 and the cover region 22 may be provided by firing, for example.

The base region 21 may be a conductive film including, for example, Cu as a main component. The base region 21 may cover the first end surface 17c1 and the second end surface 17c2 of the multilayer body 12, respectively. The base region 21 may be in direct contact with the end surfaces of the internal electrode layers 14 exposed at each of the first end surface 17c1 and second end surface 17c2 to provide electrical connection. The base region 21 may cover the entire or substantially the entire surface of the first end surface 17c1 at the end portion 17d1 on the first end surface. Furthermore, the base region 21 may straddle four surfaces including the first main surface 17a1 and the second main surface 17a2 opposed to each other, and the first side surface 17b1 and the second side surface 17b2 opposed to each other. The same applies to the end portion 17d2 on the second end surface. That is, the base region 21 may cover the entire or substantially the entire surface of the second end surface 17c2 at the end portion 17d2 on the second end surface. Furthermore, the base region 21 may straddle four surfaces including the first main surface 17a1 and the second main surface 17a2 opposed to each other, and the first side surface 17b1 and the second side surface 17b2 opposed to each other.

The cover region 22 may be a conductive film including, for example, Ag as a main component. The cover region 22 may be provided over the base region 21 and cover the base region 21. The cover region 22 may cover at least a portion where the base region 21 covers each of the first end surface 17c1 and the second end surface 17c2. The cover region 22 may cover the entire or substantially the entire surface of the base region 21. Furthermore, the cover region 22 may be provided so that a portion on the edge of the base region 21 which covers the first main surface 17a1, the second main surface 17a2, the first side surface 17b1, and the second side surface 17b2 is exposed, for example.

Herein, including Cu as a main component may mean that the component of Cu accounts for about 70 wt % or more, for example. Furthermore, including Ag as a main component may mean that the component of Ag accounts for about 90 wt % or more, for example. That is, the base region 21 may include about 70 wt % or more of Cu, for example. Furthermore, the cover region 22 may include about 90 wt % or more of Ag, for example.

The reaction region 23 may be an alloy layer provided by reacting metal components of the base region 21 and the cover region 22 when the cover region 22 is provided by firing. That is, for example, Cu in the base region 21 reacts with Ag in the cover region 22 when they are heated by heat treatment at the time of firing. The resultant Cu—Ag alloy including oxygen (O) may be provided as the reaction region 23.

Herein, the base region, the cover region, and the reaction region may be defined as follows, respectively. The base region may refer to, for example, a region where Cu is detected and Ag is not detected when the external electrode is analyzed using an Energy Dispersive X-ray Microanalyzer (EDX). The cover region may refer to, for example, a region in which Ag is detected and Cu is not detected when the external electrode is analyzed using the EDX. The reaction region may refer to, for example, a region in which Cu and Ag are detected when the external electrode is analyzed using the EDX.

The base region 21 may be, for example, a base layer formed by the following method. A conductive Cu paste including Cu powder is applied to the end portion 17d1 on the first end surface and the end portion 17d2 on and the second end surface of the multilayer body 12, following which the resultant product is heated at a predetermined firing temperature. The cover region 22 may be formed by, for example, the following method. A conductive Ag paste including Ag powder is applied onto the base layer to form a cover layer, following which the cover layer is heated at a predetermined firing temperature. After the base layer is provided by firing, the cover layer may be formed by firing, such that the external electrode 20 is provided.

As described above, after the forming step of the base region 21 is performed, the forming step of the cover region 22 may be performed. Alternatively, the formation of the base region 21 and the formation of the cover region 22 may be performed simultaneously. In this case, the cover layer may be formed by applying the conductive Ag paste on the base layer formed by applying the conductive Cu paste to the multilayer body 12. Thereafter, the base layer and the cover layer may be simultaneously fired. The reaction region 23 may be formed in the process of forming the base region 21 and the cover region 22 by firing the base layer and the cover layer, respectively.

According to the multilayer ceramic capacitor 10 of the present preferred embodiment of the present invention, when it is assumed that moisture penetrates from the surface of the cover region 22 toward the internal electrode layers 14, the reaction region 23 reduces or prevents moisture from penetrating, and the moisture hardly reaches the internal electrode layers 14. As a result, a decrease in moisture resistance is reduced or prevented.

The external electrode 20 of the present preferred embodiment of the present invention may be formed, for example, as follows. In the following description, first, the base layer is formed by firing the conductive Cu paste. Next, a cover layer formed by applying the conductive Ag paste to the base layer is fired. As a result, the external electrode 20 having the base region 21, the cover region 22, and the reaction region 23 is formed.

Figure 3A:
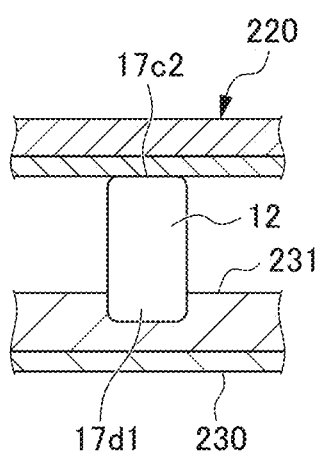
FIGS. 3A to 3C are transition diagrams of a method of forming a base layer defining and functioning as a base region of an external electrode in a multilayer ceramic capacitor according to a preferred embodiment of the present invention in the order of FIGS. 3A to 3C.
Figure 3B:
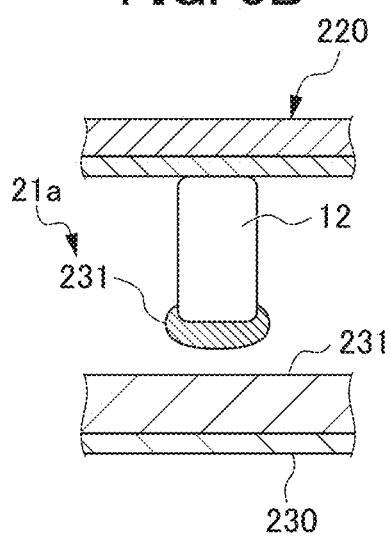
Figure 3C:
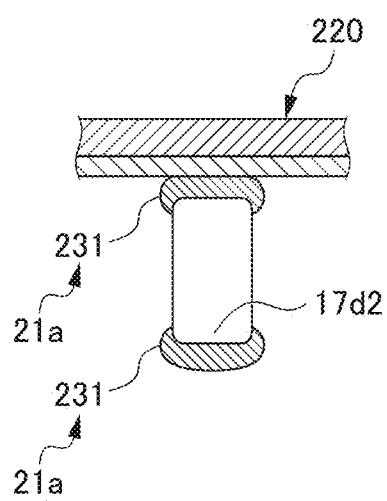

As shown in FIGS. 3A to 3C, the base layer 21a may be provided at each of the end portion 17d1 on the first end surface and the end portion 17d2 on the second end surface in the multilayer body 12. The base layer 21a may be formed by, for example, a dipping method in which the multilayer body 12 is immersed in the conductive Cu paste 231. The conductive Cu paste 231 may include, for example, Cu powder, a binder, and an organic solvent in an appropriate ratio. As shown in FIG. 3A the second end surface 17c2 of the multilayer body 12 may be adhesively held by an adhesive sheet 220, and the end portion 17d1 on the first end surface may be immersed in the conductive Cu paste 231 held on a plate 230. Then, as shown in FIG. 3B, the multilayer body 12 may be separated from the conductive Cu paste 231. Thus, the conductive Cu paste 231 may be applied to the end portion 17d1 on the first end surface. Similarly to the above, the end portion 17d2 on the second end surface of the multilayer body 12 may be immersed in the conductive Cu paste 231, as shown in FIG. 3C, such that the conductive Cu paste 231 may be applied to the end portion 17d2 on the second end surface. When the conductive Cu paste 231 is applied to the end portion 17d2 on the second end surface, the conductive Cu paste 231 previously applied and dried on the end portion 17d1 of the first end surface may be adhered to the adhesive sheet 220, such that the second end surface 17c2 is exposed.

Subsequently, the multilayer body 12 in which the conductive Cu paste 231 is applied and dried on each of the end portion 17d1 of the first end surface and the end portion 17d2 of the second end surface may be heated at a predetermined firing temperature, such that the conductive Cu paste 231 is fired on the multilayer body 12 to form the base layer 21a.

Figure 4:
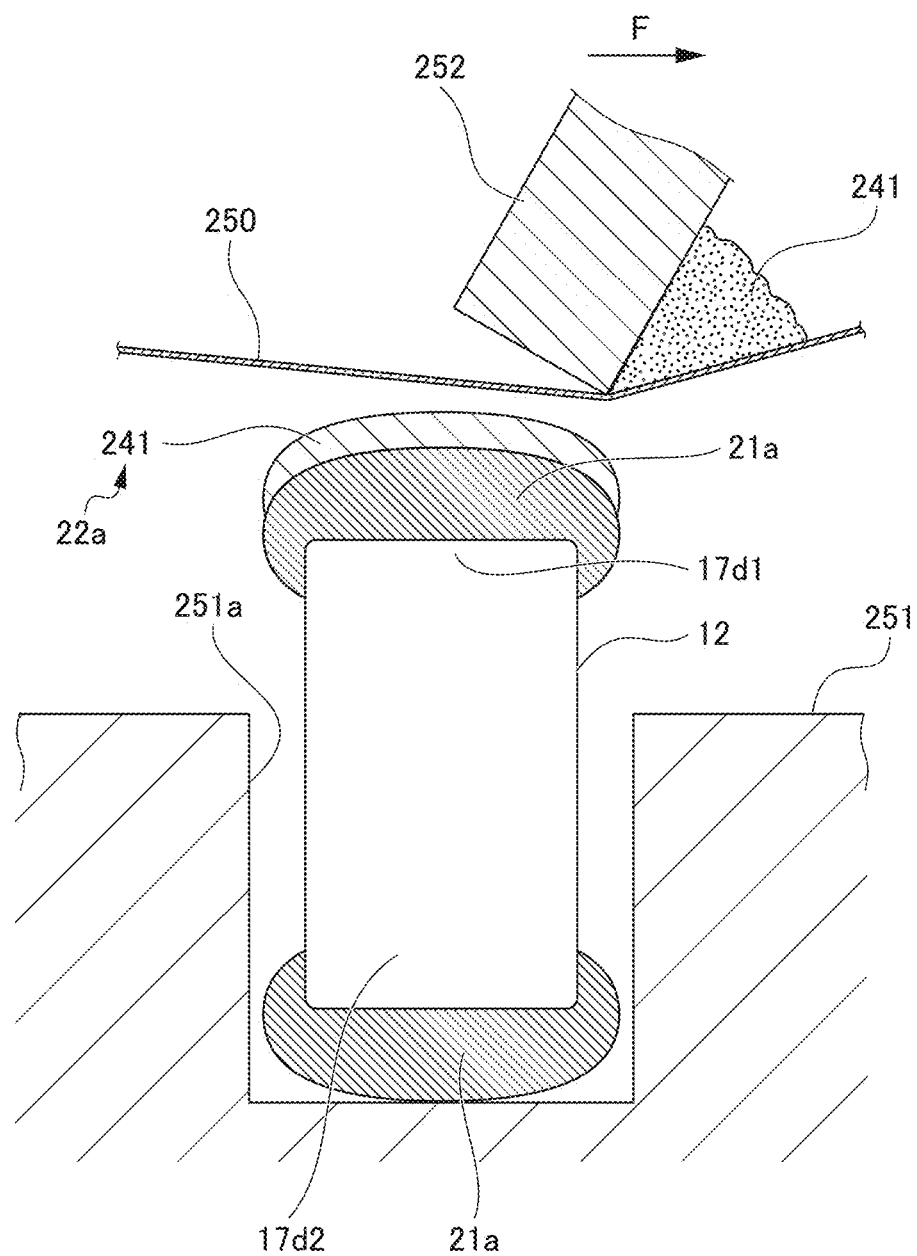
FIG. 4 is a transition diagram of a method of forming a cover layer defining and functioning as a cover region of the external electrode in a multilayer ceramic capacitor according to a preferred embodiment of the present invention.

Next, as shown in FIG. 4, the cover layer 22a may be formed on each of the base layers 21a. As shown in FIG. 4, the cover layer 22a may be formed by, for example, a screen printing method of printing a conductive Ag paste 241 with a screen printing plate 250. The conductive Ag paste 241 may include, for example, Ag powder, a binder, and an organic solvent in an appropriate ratio.

As shown in FIG. 4, the multilayer body 12 in which the base layer 21a is provided on each of the end portion 17d1 on the first end surface and the end portion 17d2 on the second end surface may be held in a hole 251a of a holding plate 251 provided on the lower side of the screen printing plate 250. Thus, the end portion 17d1 on the first end surface may be opposed to the screen printing plate 250. The conductive Ag paste 241 provided on the screen printing plate 250 may be moved by, for example, a squeegee 252 so as to scrape toward the direction of the arrow F, while the screen printing plate 250 may be pressed against the surface of the base layer 21a made of the conductive Cu paste. As a result, the conductive Ag paste 241 defining and functioning as the cover layer 22a may be applied to the surface of the base layer 21a. By similarly performing this step on the end portion 17d2 on the second end surface, the conductive Ag paste 241 defining and functioning as the cover layer 22a may also be applied to the surface of the base layer 21a made of the conductive Cu paste 231 provided on the end portion 17d2 on the second end surface.

Thereafter, the multilayer body 12 in which the cover layer 22a obtained by applying and drying the conductive Ag paste 241 to each of the base layer 21a of the end portion 17d1 on the first end surface and the base layer 21a of the end portion 17d2 on the second end surface is provided may be heated at a predetermined firing temperature, and the cover layer 22a may be fired on the base layer 21a. Firing of the cover layer 22a may be performed in an atmosphere including nitrogen, for example, at a temperature of about 200° C. or more and about 370° C. or less. Firing allows the cover layer 22a to be anchored to the base layer 21a. During firing, Cu included in the conductive Cu paste 231 and Ag included in the conductive Ag paste 241 react with each other, such that a Cu—Ag alloy layer may be formed as the reaction region 23 between the base layer 21a and the cover layer 22a. At the same time, the base layer 21a may be fired to form the base region 21, and the cover layer 22a may be fired to form the cover region 22.

FIGS. 3A to 3C and 4 illustrate one multilayer body 12. However, the plurality of multilayer bodies 12 may be collectively held by the adhesive sheet 220 and the holding plate 251. In this case, the conductive Cu paste 231 and the conductive Ag paste 241 may be applied collectively to each of the end portions 17d1 on the first end surface and the end portion 17d2 on the second end surface of the plurality of multilayer bodies 12.

The multilayer ceramic capacitor 10 is manufactured, for example, as described above. The external electrode 20 may further include a plated layer on the cover region 22. Such a plated layer may include, for example, a single-layer structure by a Ni plated layer, a Sn plated layer, or the like, or a multilayer structure including the Sn plated layer on the Ni plated layer. The plated layer may be formed by, for example, a barrel plating method. In the barrel plating method, a plurality of multilayer bodies 12 including the cover region 22 may be introduced into and immersed in the plating solution in the barrel, such that the plated layer may be formed on the surface of the cover region 22 while rotating the barrel.

FIG. 5 shows the first external electrode 20a provided on the end portion 17d1 of the first end surface in the multilayer ceramic capacitor 10 of the present preferred embodiment of the present invention. The second external electrode 20b of the end portion 17d2 on the second end surface also includes the same or substantially the same structure as the first external electrode 20a. For this reason, the first external electrode 20a will be described as an example of the external electrode 20.

In the first external electrode 20a, the thickness (dimension in the length direction L) of the base region 21 in the portion covering the first end surface 17c1 may be, for example, about 6 μm to about 20 μm. The thickness of the cover region 22 in the portion covering the first end surface 17c1 may be, for example, about 2 μm to about 4 μm. In addition, the thickness of the reaction region 23 in the portion covering the first end surface 17c1 may be, for example, about 0.1 μm to about 0.4 μm.

In the present preferred embodiment of the present invention, the ratio of the area of the reaction region 23 to the entire area of the first external electrode 20a in the LT cross-section at the middle portion in the width direction W of the multilayer ceramic capacitor 10 may be, for example, about 9% or more and about 81% or less, and preferably about 18% or more and about 42% or less. The LT cross-section may refer to a cross-section along the length direction L and the lamination direction T.

As shown in FIG. 5, when the base layer 21a formed by the above-described dipping method is fired to form the base region 21, the portion covering the first end surface 17c1 in the base region 21 often includes a mountain shape that protrudes outward in the length direction L such that the thickness of the middle portion reaches a maximum. This is because, when separating the multilayer body 12 from the conductive Cu paste 231 in the vicinity of the plate 230 described above, the middle portion of the conductive Cu paste 231 adhering to the multilayer body 12 is pulled to the end. On the other hand, in the cover region 22 where the cover layer 22a formed by the screen printing method described above is provided by firing, the middle portion in the lamination direction T may be a flat or substantially flat surface, and both end portions may each have an R shape. Thus, the cover region 22 may include maximum thickness portions 22A, at both ends in the lamination direction T. In the present preferred embodiment of the present invention, each of the maximum thickness portions 22A may be provided in an area corresponding to the ranges 14G1 and 14G2. The ranges 14G1 and 14G2 may be respectively ranges of, for example, about ±10 μm in the lamination direction T centered around the internal electrode layers 14 (denoted by reference numerals 14S1 and 14S2 in FIG. 5) provided at both of the outermost ends in the lamination direction T among the plurality of internal electrode layers 14. The maximum thickness portion 22A of the cover region 22 is preferably thicker than the middle portion 22B in the lamination direction T of the cover region 22, for example. The maximum thickness portion 22A preferably has a thickness of about 3.8 μm or more and about 6.8 μm or less, for examples.

As described above, the second external electrode 20b of the end portion 17d2 on the second end surface may also have the above-described structure shown in FIG. 5, for example.

The multilayer ceramic capacitor 10 of the present preferred embodiment of the present invention may include the maximum thickness portions 22A, as described above. The maximum thickness portions 22A may each include the thicker cover region 22 having the ranges 14G1 and 14G2 which may be respectively ranges of, for example, about ±10 μm in the lamination direction T centered around the internal electrode layers 14S1 and 14S2 provided at both of the outermost ends in the lamination direction T than the other portions, as described above. The maximum thickness portions 22A of the cover region 22 may each compensate for the thinner portions of both ends of the base region 21 having a mountain shape, such that the thickness of the entire external electrode 20 may be ensured sufficiently and evenly. As a result, moisture penetration from the outside toward the internal electrode layers 14 is reduced or prevented.

In a case where the base region 21 and the cover region 22 are formed by firing the conductive paste, each of the base region 21 and the cover region 22 may include a large number of pores or voids therein, and the reaction region 23 may also include pores or voids therein. Here, in the present preferred embodiment of the present invention, the average size of voids included in the reaction region 23 is preferably smaller than the average size of voids included in the cover region 22, for example. Moisture enters from the outside by passing through the voids. However, the average size of voids included in the reaction region 23 may be smaller than the average size of voids included in the cover region 22. Thus, it is possible to improve the effect of preventing moisture from entering by the reaction region 23.

The multilayer ceramic capacitor 10 according to the present preferred embodiment of the present invention described above has the following advantageous effects.

The multilayer ceramic capacitor 10 according to the present preferred embodiment of the present invention includes the multilayer body 12 including the plurality of dielectric ceramic layers 13 and the plurality of internal electrode layers 14 which are laminated alternately in the lamination direction T, the first main surface 17a1 and the second main surface 17a2 opposing each other in the lamination direction T, the first side surface 17b1 and the second side surface 17b2 opposing each other in the width direction W perpendicular or substantially perpendicular to the lamination direction T, and the first end surface 17c1 and the second end surface 17c2 opposing each other in the length direction L perpendicular or substantially perpendicular to the lamination direction T and the width direction W, and the pair of external electrodes 20 on both end portions in the length direction L of the multilayer body 12 and respectively connected to the internal electrode layers 14. The pair of external electrodes 20 each include the base region 21 that covers at least each of the first end surface 17c1 and the second end surface 17c2, and includes Cu as a main component, the cover region 22 on the base region 21 to cover the base region 21, and includes Ag as a main component, and the reaction region 23 between the base region 21 and the cover region 22 including Cu included in the base region 21 and Ag included in the cover region 22 reacting with each other.

As a result, even if the thickness of the external electrode 20 is reduced to shorten the path of moisture from the surface of the cover region 22 to the internal electrode layer 14, the reaction region 23 reduces or prevents moisture from entering, such that the moisture hardly reaches the internal electrode layer 14. As a result, it is possible to reduce or prevent a decrease in moisture resistance. Therefore, it is possible to achieve both thinning and moisture resistance improvement of the external electrode 20.

In the multilayer ceramic capacitor 10 according to the present preferred embodiment of the present invention, the ratio of the area of the reaction region 23 to the entire area of each of the pair of external electrodes 20 in the LT cross-section along the length direction L and the lamination direction T at the middle portion in the width direction W is preferably, for example, about 9% or more and about 81% or less.

Thus, it is possible to sufficiently obtain the effect of moisture reduction or prevention by the reaction region 23.

In the multilayer ceramic capacitor 10 according to the present preferred embodiment of the present invention, the ratio of the area of the reaction region 23 to the entire area of each of the pair of external electrodes 20 in the LT cross-section along the length direction L and the lamination direction T at the middle portion in the width direction W is more preferably, for example, about 18% or more and about 42% or less.

Thus, it is possible to sufficiently obtain the effect of moisture reduction or prevention by the reaction region 23 and to promote the thinning of the external electrode 20.

In the multilayer ceramic capacitor 10 according to the present preferred embodiment of the present invention, the average size of the voids included in the reaction region 23 is preferably smaller than the average size included in the cover region 22.

Thus, it is possible to improve the effect of reducing or preventing moisture from entering by the reaction region 23.

The multilayer ceramic capacitor 10 according to the present preferred embodiment of the present invention includes the multilayer body 12 including the plurality of dielectric ceramic layers 13 and the plurality of internal electrode layers 14 which are laminated alternately in the lamination direction T, the first main surface 17a1 and the second main surface 17a2 opposing each other in the lamination direction T, the first side surface 17b1 and the second side surface 17b2 opposing each other in the width direction W perpendicular or substantially perpendicular to the lamination direction T, and the first end surface 17c1 and the second end surface 17c2 opposing each other in the length direction L perpendicular or substantially perpendicular to the lamination direction T and the width direction W, and the pair of external electrodes 20 on both end portions in the length direction L of the multilayer body 12 and respectively connected to the internal electrode layers 14. The pair of external electrodes 20 each include the base region 21 that covers at least each of the first end surface 17c1 and the second end surface 17c2, and is connected to the internal electrode layers 14, and the cover region 22 on the base region 21 to cover the base region 21. The cover region 22 includes the maximum thickness portions 22A each including a maximum thickness in the cover region 22, in a region corresponding to the ranges 14G1 and 14G2 of about ±10 µm in the lamination direction T centered around the internal electrode layers 14S1 and 14S2 provided at both outermost ends in the lamination direction T among the plurality of internal electrode layers 14.

With such a configuration, when the base region 21 has a mountain shape, the maximum thickness portions 22A of the cover region 22 each compensate for the thinner portions of both ends of the base region 21, such that the thickness of the entire external electrode 20 is ensured sufficiently and evenly. Therefore, even if the external electrode 20 is formed thinly, moisture penetration from the outside toward the internal electrode layers 14 is reduced or prevented, and it is possible to achieve both thinning and improvement in moisture resistance of the external electrode 20.

In the multilayer ceramic capacitor 10 according to the present preferred embodiment of the present invention, the cover region 22 preferably includes, for example, Ag.

In the multilayer ceramic capacitor 10 according to the preferred embodiment of the present invention, it is preferable that the thickness of the maximum thickness portion 22A in the cover region 22 is about 3.8 μm or more and about 6.8 μm or less, for example.

As a result, the advantageous effects of ensuring the thickness of the entire external electrode 20 by the cover region 22 can be sufficiently achieved, and moisture resistance can be further improved.

In the multilayer ceramic capacitor 10 according to the present preferred embodiment of the present invention, the base region 21 preferably includes, for example, Cu as a main component. It is also preferable to include the reaction region 23 provided by reacting Cu included in the base region 21 with Ag included in the cover region 22 between the base region 21 and the cover region 22.

With such a configuration, penetration of moisture is reduced or prevented by the reaction region 23, such that moisture hardly reaches the internal electrode layer 14, and as a result, it is possible to reduce or prevent a decrease in moisture resistance, and both thinning and improvement in moisture resistance of the external electrode 20 can be achieved.

TEST EXAMPLES

Next, Test Examples for testing the advantageous effects of the reaction region 23 in the multilayer ceramic capacitor 10 of the present preferred embodiment of the present invention will be described. The multilayer ceramic capacitors for Test Examples 1 to 14 shown in Table 1 were manufactured. The multilayer ceramic capacitors of Test Examples 1 to 14 were provided with the structure as shown in FIG. 2. Differences in Test Examples 1 to 14 were the presence or absence of the cover region 22 and the area ratio of the reaction region 23. In Test Example 1, the cover region 22 was not provided, and only the base region 21 was used as the external electrode 20. In Test Examples 2 to 14, the external electrode 20 included the reaction region 23, and the ratios of the area of the reaction region 23 to the entire external electrode 20 were different in the LT cross-section at the middle in the width direction W, as shown in Table 1.

The reaction regions 23 were detected as follows. The external electrode 20 was polished so that the middle portion in the width direction W of the LT cross-section along the length direction L and the lamination direction T of the multilayer body 12 was exposed. Then, the polished surface (the LT cross-section as shown in FIG. 2) was imaged by SEM, and the SEM image was subjected to spectrum analysis to determine that the locations where the Cu component and the Ag component were detected corresponded to the reaction region. In the reaction region 23, the Cu component tended to peak higher than the Ag component, and in the SEM image, the reaction region 23 was different from the other portions in contrast. Since the reaction region 23 was sandwiched by the base region 21 including Cu as a main component and the cover region 22 including Ag as a main component, the regions including the same contrast between Cu and Ag were determined as the reaction region. In the LT cross-section of the external electrode 20, the area obtained by combining the base region 21 showing a high peak of Cu, the cover region 22 showing a high peak of Ag, the base region 21, the cover region 22 and the reaction region 23 was used as a population to calculate the "reaction region area ratio (%)" in Table 1.

The following tests and measurements were performed on the multilayer ceramic capacitors of Test Examples 1 to 14.

(1) Contact Failure Occurrence Ratio

Capacitance was measured for 100 pieces of multilayer ceramic capacitors of each test example, and the number of multilayer ceramic capacitors having about 80% or less of the desired capacitance which was necessary and sufficient was determined as the contact failure occurrence ratio.

(2) Defect Occurrence Ratio of Moisture Resistance

One thousand pieces of the multilayer ceramic capacitors for each test example under the environment of humidity about 85% and temperature about 85° C. were measured for the case where the insulation resistance at a voltage of about 6.3 V was below about 1 MΩ, and the case where the insulation resistance at a voltage of about 6.3 V was below about 100 MΩ, respectively, and the ratio was determined as the defect occurrence ratio of moisture resistance. In Test Example 14, since the contact defect occurrence ratio was 100%, the defect occurrence ratio of moisture resistance was not tested.

(3) Occurrence Ratio of Poor Adhesion of Cover Region

For 100 pieces of the multilayer ceramic capacitors for each test example, the ratio of the cover region 22 peeled from the base region 21 when a force was applied so as to forcibly peel off the cover region 22 was obtained as the occurrence rate of poor adhesion of the cover region 22.

(4) Thickness M at Middle Portion of Cover Region

For 20 pieces of the multilayer ceramic capacitors for each test example, the thickness of the cover region 22 shown by the middle portion 22B in FIG. 2 was measured from the SEM image, and the average value was determined as the thickness M at the middle portion of the cover region 22 (thickness M at the middle portion in Table 2).

(5) Thickness N of Maximum Thickness Portion of Cover Region

For 20 pieces of the multilayer ceramic capacitors for each test example, the thickness of the maximum thickness portion 22A in FIG. 2 was measured from the SEM image, and the average value was determined as the thickness N of the maximum thickness portion N of the cover region 22 (thickness N of the maximum thickness portion in Table 2).

(6) N/M

The ratio N/M of the thickness N of the maximum thickness portion 22A of the cover region 22 to the thickness M at the middle portion 22B of the cover region 22 was obtained.

(7) Judgment

Based on the results of the above tests, the multilayer ceramic capacitors of each test example were judged by evaluating that those having excellent performances were denoted by ⊙ (bullseye symbol), those having sufficient performances were denoted by ○ (circle symbol), and those having insufficient performances were denoted by x (cross symbol). The above results are shown in Table 1.

TABLE 1

| | REACTION REGION AREA RATIO (%) | CONTACT DEFECT OCCURRENCE RATIO (%) | DETECT OCCURRENCE RATIO OF MOISTURE RESISTANCE (%) (THRESHOLD 1 MΩ) | DETECT OCCURRENCE RATIO OF MOISTURE RESISTANCE (%) (THRESHOLD 100 MΩ) | OCCURRENCE RATIO OF POOR ADHESION OF COVER REGION (%) | THICKNESS M AT MIDDLE PORTION OF COVER REGION (μm) | THICKNESS N AT MIDDLE PORTION OF COVER REGION (μm) | N/M | JUDGMENT |
|---|---|---|---|---|---|---|---|---|---|
| TEST EXAMPLE1 | NO Ag | 0.0 | 13.9 | 23.6 | 0.0 | 2.24 | 2.21 | 0.99 | X |
| TEST EXAMPLE2 | 0 | 0.0 | 2.8 | 11.1 | 30.0 | 2.08 | 1.25 | 0.60 | X |
| TEST EXAMPLE3 | 4.6 | 0.0 | 1.4 | 4.2 | 5.0 | 2.49 | 0.60 | 0.24 | X |
| TEST EXAMPLE4 | 9.9 | 0.0 | 0.0 | 2.8 | 0.0 | 2.49 | 3.88 | 1.56 | ○ |
| TEST EXAMPLE5 | 18.2 | 0.0 | 0.0 | 0.0 | 0.0 | 2.29 | 4.33 | 1.90 | ◎ |
| TEST EXAMPLE6 | 28.9 | 0.0 | 0.0 | 0.0 | 0.0 | 2.89 | 6.85 | 2.37 | ◎ |
| TEST EXAMPLE7 | 41.2 | 0.0 | 0.0 | 0.0 | 0.0 | 2.91 | 4.18 | 1.44 | ◎ |
| TEST EXAMPLE8 | 55 | 0.0 | 0.0 | 0.0 | 0.0 | 2.29 | 3.94 | 1.72 | ○ |
| TEST EXAMPLE9 | 61.4 | 0.0 | 0.0 | 0.0 | 0.0 | 2.49 | 4.92 | 1.97 | ○ |
| TEST EXAMPLE10 | 68.5 | 0.0 | 0.0 | 0.0 | 0.0 | 2.08 | 5.71 | 2.75 | ○ |
| TEST EXAMPLE11 | 80.2 | 0.0 | 0.0 | 0.0 | 0.0 | 2.05 | 5.56 | 2.71 | ○ |
| TEST EXAMPLE12 | 82.4 | 12.0 | 0.0 | 0.0 | 0.0 | 2.91 | 3.20 | 1.10 | X |
| TEST EXAMPLE13 | 88.9 | 58.0 | 0.0 | 0.0 | 0.0 | 2.91 | 2.80 | 0.96 | X |
| TEST EXAMPLE14 | 100 | 100.0 | NOT TESTED | NOT TESTED | 15.0 | 2.29 | 2.50 | 1.09 | X |

According to Table 1, it was discovered that, when the external electrode has the reaction region 23 made of a Cu—Ag alloy, and the area ratio of the reaction region 23 of the LT cross-section at the middle portion in the width direction W is about 98 or more and about 81% or less, contact failure does not occur, and the moisture resistance is favorable. Furthermore, when the area ratio of the reaction region 23 of the LT cross section at the middle portion in the width direction W in the external electrode is about 18% or more and about 42% or less, excellent performance is obtained. It was discovered that contact failure does not occur, and the moisture resistance is favorable when the cover region 22 of both end portions of the external electrode is thicker such that the ratio of the maximum thickness portion 22A is large, contact failure does not occur, and the moisture resistance is favorable.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of dielectric ceramic layers and a plurality of internal electrode layers laminated alternately in a lamination direction, a first main surface and a second main surface opposing each other in the lamination direction, a first side surface and a second side surface opposing each other in a width direction perpendicular or substantially perpendicular to the lamination direction, and a first end surface and a second end surface opposing each other in a length direction perpendicular or substantially perpendicular to the lamination direction and the width direction;
   a first external electrode on the first end surface, and connected to the internal electrode layers; and
   a second external electrode on the second end surface, and connected to the internal electrode layers; wherein
   the first external electrode includes:
      a first base region on the first end surface and
      a first cover region on the first base region; and
   the first cover region includes a maximum thickness portion including a maximum thickness in the first cover region, arranged in a region corresponding to a range of about +10 μm in the lamination direction centered around internal electrode layers at an outermost end in the lamination direction among the plurality of internal electrode layers.

2. The multilayer ceramic capacitor according to claim 1, wherein the cover region includes Ag.

3. The multilayer ceramic capacitor according to claim 2, wherein
   the base region includes Cu as a main component; and
   a reaction region including Cu included in the base region with Ag included in the cover region reacting with each other is provided between the base region and the cover region.

4. The multilayer ceramic capacitor according to claim 3, wherein the reaction region includes a Cu—Ag alloy including oxygen.

5. The multilayer ceramic capacitor according to claim 3, wherein a thickness of the reaction region is about 0.1 μm to about 0.4 μm.

6. The multilayer ceramic capacitor according to claim 1, wherein a thickness of the maximum thickness portion in the cover region is about 3.8 μm or more and about 6.8 μm or less.

7. The multilayer ceramic capacitor according to claim 1, wherein each of the plurality of dielectric ceramic layers includes at least one of Ni, Cu, Ag, Pd, Ag—Pd alloy, or Au.

8. The multilayer ceramic capacitor according to claim 1, wherein
the plurality of dielectric ceramic layers include a plurality of first dielectric ceramic layers and a plurality of second dielectric ceramic layers; and
a thickness of each of the plurality of second dielectric ceramic layers is greater than a thickness of each of the plurality of first dielectric ceramic layers.

9. The multilayer ceramic capacitor according to claim 8, wherein a thickness of each of the plurality of first ceramic layers is about 0.4 μm or more and about 0.53 μm or less.

10. The multilayer ceramic capacitor according to claim 1, wherein the first cover region covers a portion of the first base region.

11. The multilayer ceramic capacitor according to claim 1, wherein the first cover region covers an entirety or substantially an entirety of the first base region.

12. The multilayer ceramic capacitor according to claim 1, wherein the first base region covers a portion of each of the first and second main surfaces and a portion of each of the first and second side surfaces.

13. The multilayer ceramic capacitor according to claim 1, wherein the first base region includes about 70% or more of Cu.

14. The multilayer ceramic capacitor according to claim 1, wherein the first cover region includes about 90% or more of Ag.

15. The multilayer ceramic capacitor according to claim 1, wherein a thickness of the first base region is about 6 μm to about 20 μm.

16. The multilayer ceramic capacitor according to claim 1, wherein a thickness of the first cover region is about 2 μm to about 4 μm.

* * * * *